Jan. 21, 1947.    K. R. ELDREDGE ET AL    2,414,457
DETONATION PICK-UP DEVICE
Filed Aug. 10, 1943

INVENTORS
KENNETH R. ELDREDGE
ELDRED E. EDWARDS
BY [signature]
ATTORNEY

Patented Jan. 21, 1947

2,414,457

UNITED STATES PATENT OFFICE 2,414,457

DETONATION PICKUP DEVICE

Kenneth R. Eldredge, Berkeley, and Eldred E. Edwards, Walnut Creek, Calif., assignors, by mesne assignments, to California Research Corporation, San Francisco, Calif., a corporation of Delaware Application August 10, 1943, Serial No. 498,076

3 Claims. (Cl. 177—351)

This invention relates to devices for indicating rapidly changing forces, and particularly refers to an apparatus which will respond to pressure fluctuations, such as those found in the combustion chamber of an internal combustion engine, and is effective to generate a voltage that may be measured to give an indication of the magnitude, rate of change, and other characteristics of said pressure changes. It is an improvement over the apparatus described and claimed in the K. R. Eldredge Patent No. 2,269,760, issued January 13, 1942.

Heretofore, electrical contactors, bouncing pins, condensers, piezo crystals and the like have been used in an effort to measure or to indicate rapid pressure fluctuations, such as those which occur in internal combustion engines, and particularly during that type of combustion which produces detonation or pinging in the combustion chamber. These prior methods have many and serious disadvantages which are well known to those skilled in this art, and particularly are usable only under favorable or laboratory conditions, where the elaborate and delicate control and indicating equipment heretofore required for these measurements can properly be handled.

This invention comprehends broadly an improved pick-up unit for transforming rapid fluctuations in a force or a fluid pressure into corresponding voltage changes, actually being a generator of such voltages and, with suitable simple and rugged indicating equipment, adapted to indicate any desired functions of the said force or pressure, such as its average value, instantaneous value, rate of change, and the like. Essentially it includes an element of a magnetostrictive material, for example an alloy of about 52% nickel and 48% iron, with only traces of other substances, said element adapted to be mechanically stressed by the said fluctuations, and incorporated in a magnetic circuit one part of which may constitute a source of magnetic flux from means which may include a so-called permanent magnet. A coil or winding is associated with some portion of the magnetic flux path, desirably the magnetostrictive element and, when the magnetic permeability of the element is modified by the stresses, the quantity of flux in the magnetic circuit is correspondingly modified, resulting in an induced voltage in the winding, which may be detected directly by suitable instruments and may be amplified or modified and used to actuate simple visual or other types of indicators or recorders.

This invention is specifically directed to an improvement in the means for impressing upon the magnetostrictive element of a detonation pickup unit, such as that of the Eldredge Patent No. 2,269,760, the pressure fluctuations to be measured. It comprehends broadly a force transmitting member which is freely and deformably positioned within a bore in such a manner that it is free to assume an equilibrium position therein and to make a sufficiently fluid tight contact therewith at its outer edge substantially to transmit even the most rapid pressure fluctuations without appreciable frictional loss or damping.

It is an object of this invention to provide an improved pressure responsive unit adapted to generate an electrical potential which is a function of the pressure which, both in magnitude and direction, will be responsive to very high frequencies or rates of change of pressure, such as are encountered in measuring detonation in an internal combustion engine cylinder.

Another object is to provide an improved means for transmitting variations in fluid pressure to an element which is substantially rigidly fixed or mounted and of such a nature that no appreciable or measurable motion or distortion of said element takes place, except that due to the extremely slight deformation of said element under the stresses imposed by said fluid pressure changes.

Another object is to provide a fluid pressure change transmitting means which will be free of any effects of temperature or pressure variations that would tend to produce an initial and undesired stress in the element against which the force of engine combustion pressures is ultimately impressed.

These and other objects and advantages will be further apparent from the following description and from the attached drawing which forms a part of this specification and illustrates a preferred embodiment of this invention as applied to a detonation pick-up unit which is usable on internal combustion engines, and particularly aircraft engines where the size of such units must be very small.

Figure 1:
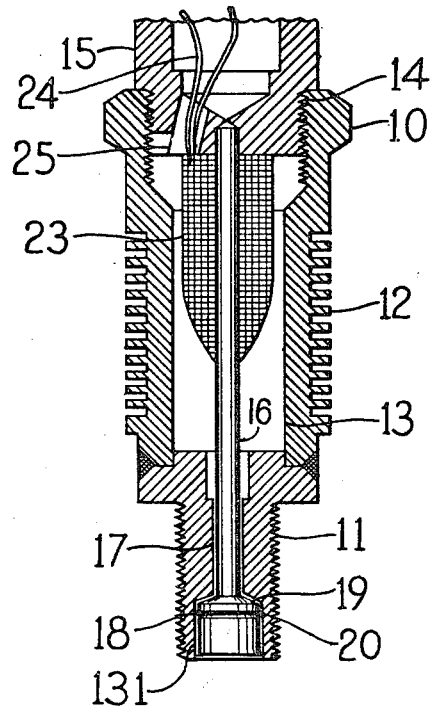
Figure 1 is a longitudinal sectional view of a pressure responsive unit embodying this invention.

Referring to the drawing and particularly to Figure 1, reference numeral 10 designates a rigid and, in this example, generally cylindrical body or housing, threaded at 11 to be received in a similarly threaded opening in an engine cylinder head or the like and leading to the combustion chamber, or other source of fluid pressure to be measured. Where high temperatures are involved, body 10 is preferably provided with cooling means, such as circumferential fins 12. In this embodiment, body 10 is made of steel or some other paramagnetic material so as to be a good conductor for magnetic flux. Axial bore generally designated 13 extends throughout body 10 and may be enlarged at its upper end and threaded at 14 to receive a plug 15 which forms a closure for the upper end of bore 13. If desired, plug 15 or body 10 may be made of a ferrous alloy adapted to be permanently magnetized to provide a substantially uniform source of magnetic flux for an elongated element or rod of magnetostrictive material 16.

Figure 2:
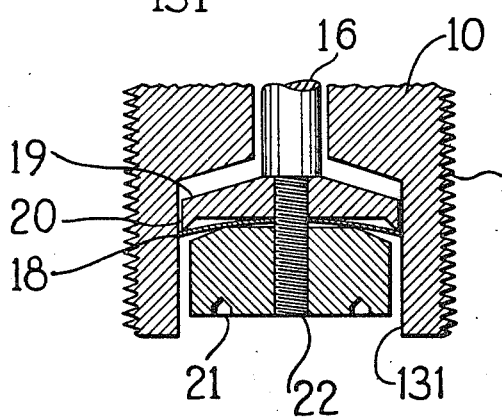
Figure 2 is a detailed sectional view of the lower end of the unit shown in Figure 1, to an enlarged scale showing in more detail a preferred arrangement of the pressure change transmitting means.

There are many types of magnetostrictive material that are suitable for element 16, one being an alloy of about 52% nickel, about 48% iron and only traces of other elements, which may be suitably heat treated to have the desired magnetic properties. Generally the magnetostrictive material may be defined as one which changes its permeability or ease of conducting a magnetic flux with a change in the physical stress exerted within a body of the said material due to a mechanical force, which may be tension, compression or torsion, applied to the said body. In this example, a magnetic flux path is set up through plug 15, element 16 and housing 10, the latter desirably but not necessarily being extended inwardly to approach fairly closely a portion of the element 16 adjacent its outer or free end, as at 17. Alternative constructions for setting up such a flux path, such as the separate magnetic yoke illustrated in Figure 2 of the Eldredge Patent No. 2,269,760, will be obvious to one skilled in this art.

In place of the welded diaphragm closing the lower end of bore 13 and adapted to exert a force upon the magnetostrictive element, shown in the Eldredge patent cited above, this invention utilizes a means such as a thin resilient metal disc 18 secured to the free end of magnetostrictive element 16 and, in the embodiment illustrated, slightly larger in its diameter than the enlarged lower portion of bore 131, beyond the constricted portion 17, within which it is positioned. As a consequence, the resilient member or disc 18 must be deformed slightly with respect to its original plane configuration so that it may enter the bore 131. For convenience of definition, it may be stated that the disc or member 18 is freely and deformably positioned in said bore, said disc contacting the latter only at its resilient outer edge. For example, with an enlarged bore 131 of 0.250 inch in diameter, disc 18 may be from 0.252 to 0.253 inch in diameter and 0.002 inch thick. In this embodiment, disc 18 and bore 131 are illustrated as being round, but it is obvious that they could be of any desired configuration which would be easy to manufacture.

The thickness of disc 18 preferably is chosen to be such that, for the diameter of the bore at the line of contact, it would have such an area that it would normally fail under the unit pressure applied thereto from the source of fluid pressure to be investigated. In order to prevent this failure, the central portion of the disc may be supported, for example by being clamped between a cup member 19 having an outwardly axially directed rim 20 and a chamfered nut 21, both adapted to be secured to the outer or free end of magnetostrictive element 16 by means of threads 22. Desirably, the diameters of rim 20 and the supporting edge or shoulder at the top of nut 21 are chosen to be unequal, with the former greater than the latter, for convenience in assembly and also for better operating efficiency.

The arrangement just described provides a rigid body or housing 10 with a pressure transmitting means 18 against which varying fluid pressure will act to produce correspondingly varying stresses in the magnetostrictive element 16, which will vary the amount of flux passing through the magnetic path comprising plug 15, element 16 and housing 10 mentioned above.

In order to determine the extent of the flux changes in this path, a winding 23 of insulated wire to form a coil is placed upon element 16 of the example shown. Flux changes traversing winding 23 will induce therein an electrical potential which may be transmitted out of body 10 through lead wires 24 to any suitable indicating instrument, such as the amplifier and cathode ray oscillograph shown in the Eldredge Patent No. 2,269,760. Desirably, winding 23 and the passage 25 where lead wires 24 extend through plug 15 are suitably impregnated and filled with an initially plastic or fluid electrically insulating material, such as a synthetic resin, which may be polymerized or otherwise modified in place to form a heat resistant and pressure resistant mass. In operation, it will be found that when measuring detonation in an engine cylinder, the slight gas leakage between bore 131 and disc 18 will ultimately cause the space within bore 13 which is not occupied by winding 23 and element 16 to become substantially filled with condensed lubricating oil. This has been found not to affect the operation of the device and may even be considered to add to its efficiency by acting as a transverse damping medium for element 16 as well as a heat transfer agent between the lower end of body 10, rod 16, winding 23 and the heat dissipating fins 12.

It will be appreciated from the foregoing description and from the drawing that the disc 18, being freely and deformably positioned in the axial bore of body 10, will be effective to function as a diaphragm contacting the bore only at its resilient outer edge and thereby to transmit extremely rapid fluctuations in pressure exerted against the open end of bore 131 as a force exerted against magnetostrictive element 16, thus causing corresponding voltage changes in winding 23 which may be indicated by suitable well known electrical equipment. Changes in length of body 10 and element 16 due to temperature or other causes may be accommodated without introducing false pressure effects or stresses in element 16 due to the freedom of disc 18 to assume an equilibrium position within bore 131 and in resilient contact therewith. Similarly, temperature or pressure changes or residual strain, such as torsion in element 16, due to assembly are quickly dissipated when disc 18 assumes its equilibrium position.

Thus it will be understood that a new and simple type of fluid pressure transmitting means has been disclosed, which is particularly adapted to a detonation pick-up indicator such as that described in the Eldredge Patent No. 2,269,760, although it is obviously not limited to that device and function. Many changes and modifications could be made from the specific example described and illustrated without departing from the invention, and it is to be understood that all such changes that fall within the scope of the appended claims are embraced thereby.

We claim:

1. A pressure change pick-up unit for a source of variable pressure such as an internal combustion engine cylinder, comprising a body having a bore therein, means closing one end of said bore, an elongated element of magnetostrictive material secured at one end in said bore, means for impressing a magnetic flux in said element, a winding responsive to flux changes in said element, means on said body at the open end of said bore for connecting it to said variable pressure source, a thin metal disc secured to the free end of said element, and means on the free end of said rod for clamping said disc thereto at unequally spaced radial distances on opposite sides of said disc, said disc being freely and deformably positioned in said bore and in contact therewith only at its resilient outer edge, so constructed and arranged that said disc will function as a diaphragm to transmit pressure changes to said element of magnetostrictive material to stress the same and induce corresponding potential changes in said winding.

2. A pressure change pick-up unit for a source of variable pressure such as an internal combustion engine cylinder, comprising a body having a bore therein, means closing one end of said bore, an elongated element of magnetostrictive material secured at one end in said bore, means for impressing a magnetic flux in said element, a winding responsive to flux changes in said element, means on said body at the open end of said bore for connecting it to said variable pressure source, a thin metal disc secured to the free end of said element, said disc being freely and deformably positioned in said bore and in contact therewith only at its resilient outer edge, whereby said disc is sealed against said bore only by its elasticity of contact therewith, so constructed and arranged that said disc will function as a diaphragm to transmit pressure changes to said element of magnetostrictive material to stress the same and induce corresponding potential changes in said winding.

3. A pressure change pick-up unit for a source of variable pressure such as an internal combustion engine cylinder, comprising a body having a bore therein, means closing one end of said bore, an elongated element of magnetostrictive material secured at one end in said bore, means for impressing a magnetic flux in said element, a winding responsive to flux changes in said element, means on said body at the open end of said bore for connecting it to said variable pressure source, a constriction intermediate the length of said bore, and a thin transverse member deformably secured between the free end of said element and a wall of said bore beyond said constricted portion to be sealed thereagainst only by the elasticity of its unsupported free edge, so constructed and arranged that said member will function as a diaphragm to transmit pressure changes to said element of magnetostrictive material to stress the same and induce corresponding potential changes in said winding.

KENNETH R. ELDREDGE.
ELDRED E. EDWARDS.